Oct. 14, 1947.　　　S. J. MIKINA　　　2,428,807
DRIVE
Filed June 16, 1945　　　2 Sheets-Sheet 1
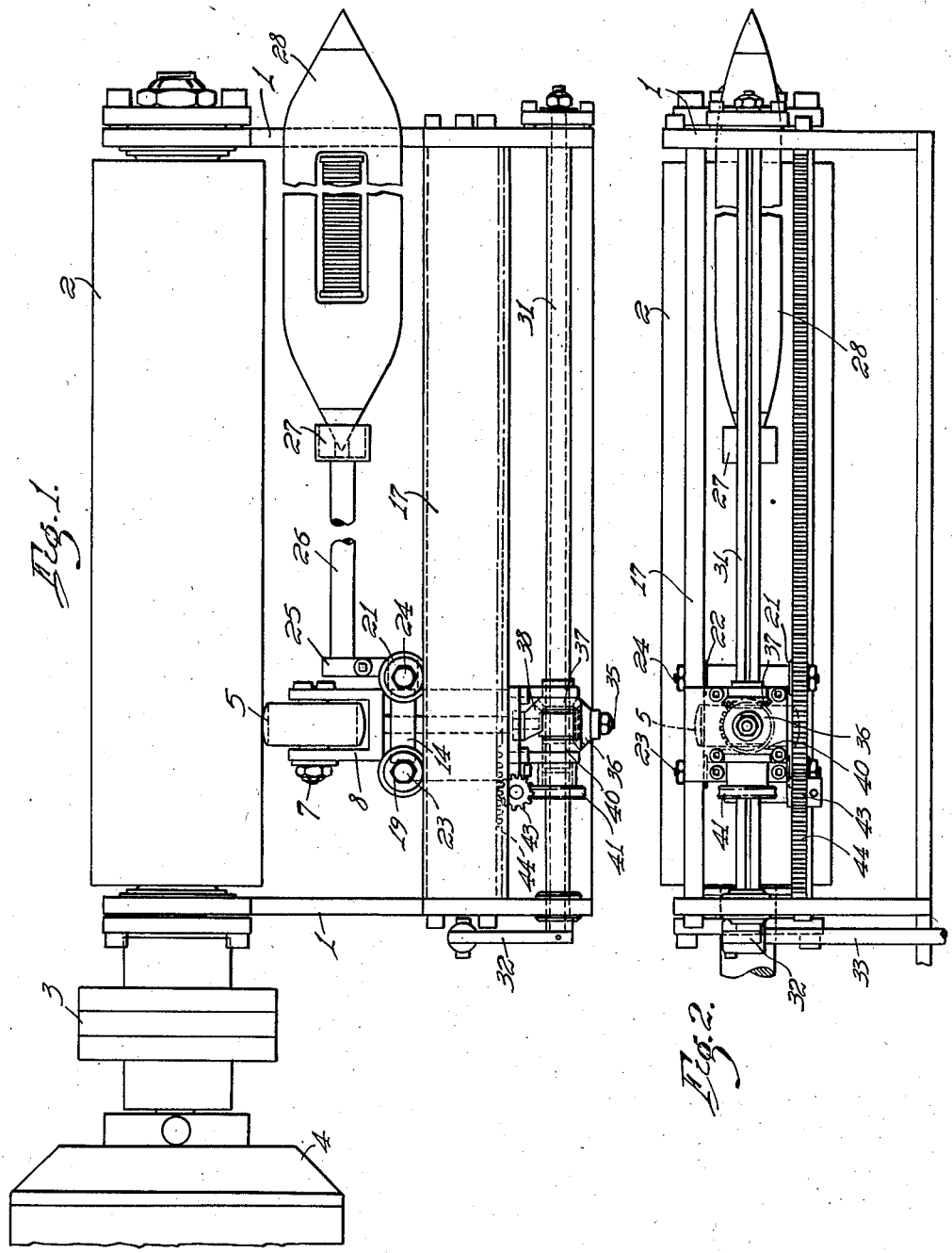
WITNESSES:
INVENTOR
Stanley J. Mikina.
BY
Paul E. Friedemann
ATTORNEY Oct. 14, 1947.　　　　S. J. MIKINA　　　　2,428,807
DRIVE
Filed June 16, 1945　　　　2 Sheets-Sheet 2
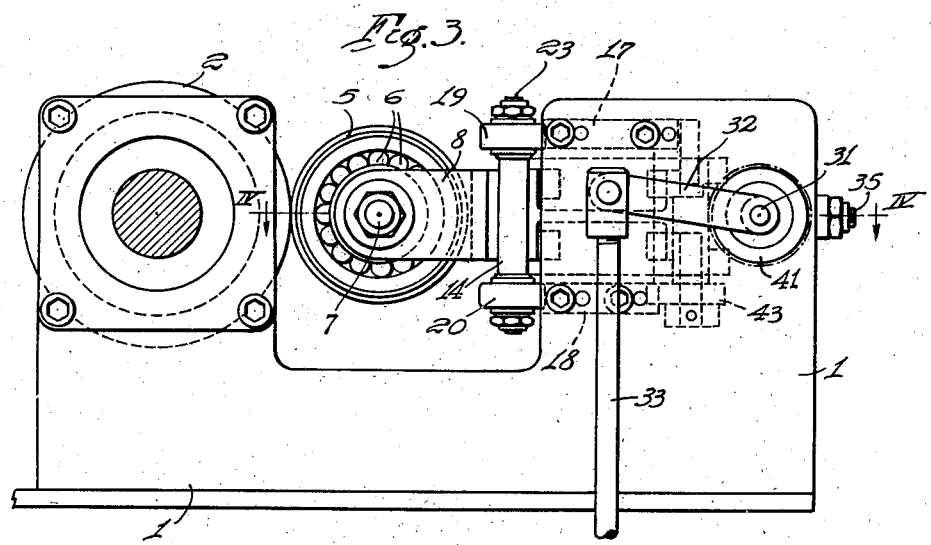
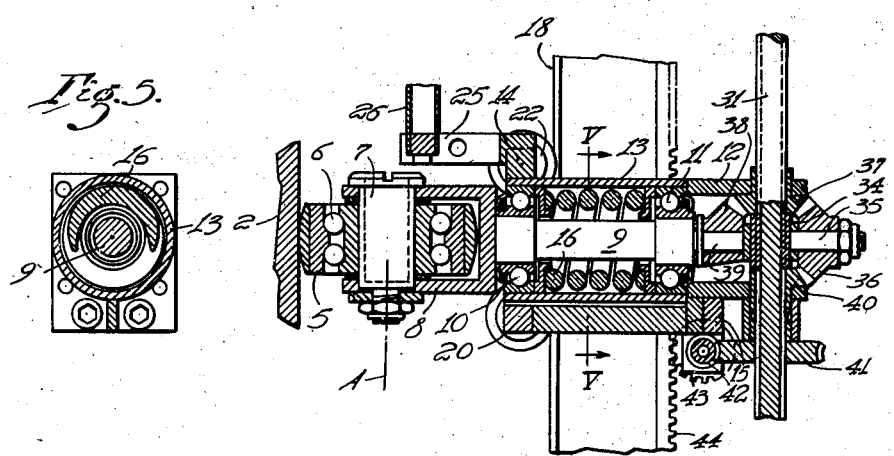
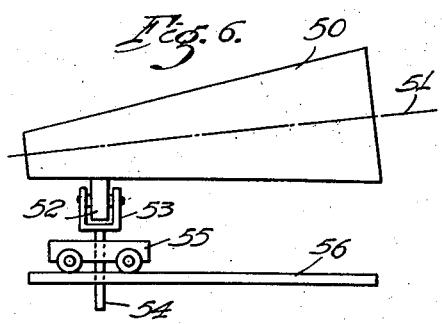
INVENTOR
Stanley J. Mikina.
BY
Paul E. Friedemann
ATTORNEY Patented Oct. 14, 1947

2,428,807

UNITED STATES PATENT OFFICE 2,428,807

DRIVE

Stanley J. Mikina, Wilkinsburg, Pa., assignor to Westinghouse Electric Corporation, East Pittsburgh, Pa., a corporation of Pennsylvania Application June 16, 1945, Serial No. 599,905

8 Claims. (Cl. 139—142)

My invention relates to mechanisms for transforming rotary motion into translational motion and especially to devices which permit controlling the velocity, extent of travel, or position of a mass to be driven. The invention is applicable as a servomotor, positioning means and other control or adjusting equipment, or for purposes of power transmission or propulsion, for instance, in drives for propelling missiles as exemplified in detail hereinafter by a drive for the flying shuttle of a loom.

It is among the objects of my invention to provide a mechanism, capable of imparting to a mass a translational motion from a source of rotary power, which permits controlling the speed of the driven mass although the power source operates at substantially constant speed.

Another object of the invention is to devise a mechanism of the type referred to which is capable of accelerating a mass to a high translational velocity in a very short period of time but in a relatively smooth manner, i. e. under avoidance of acceleration peaks.

A further object of my invention is the provision of a mechanism which permits accelerating as well as decelerating the translating motion of a mass at a high but gradual rate of speed change so that starting and stopping of the driven mass occur without collisional impact, thus minimizing the stresses imposed on the materials and structures involved in the transmission of force and motion.

It is also an object of the invention to construct a positioning or servomotor mechanism suitable for displacing a mass at high speed a controlled extent with minimum or negligible hunting tendency.

The significance of some of these objects will be illustrated by the example of conditions involved in the operation of a shuttle drive for looms. The flying shuttle must be accelerated along a short path of driving motion to a very high translational velocity. For instance, in a specific case a shuttle mass of about one lb. may have to be accelerated to a speed of about 45 ft./sec. in about 1/40 of a second. This high shuttle acceleration must be effected in a smooth manner within this short time interval; otherwise excessive peaks of acceleration may cause the bobbin thread to be displaced axially on its bobbin and to interfere with its smooth unwinding. In the customary shuttle drives, the fly shuttle is propelled across the loom by being struck with a relatively flexible wooden lever after the latter has been brought up to speed by a crank mechanism. This method of shuttle actuation imposes considerable wear and tear on the loom due to the shock loading associated with the high velocity impact between moving and stationary parts of the shuttle drive. It, therefore, is one of the more specific objects of the invention to provide highly efficient means of shuttle propulsion that overcome the objectionable features of the known drives by an accurate control of the driver position, velocity, and acceleration at every point of its cycle of motion within the extremely short time interval of shuttle projection; and it is also an object to secure a similarly advantageous functioning for other kinds of missile propulsion drives as well as for high speed mechanical drives, servomotors, positioning and adjusting devices in general.

Having these objects in mind, and in accordance with a feature of my invention, I provide a drive member or rotor, shaped as a body of revolution and revolvable about its geometrical axis, which is continuously driven, preferably at substantially constant speed, as long as the mechanism is to be kept in condition for operation. I further provide a structure, such as a slider or carriage, which is movable alongside the rotor and substantially in parallel to the generatrix of the body of revolution, and I equip the structure with a friction roller that engages the peripheral surface of the rotor. The mounting of the friction roller on the movable structure is adjustable so that the roller axis can be placed at different angles relative to the direction of the generatrix of the rotor at the point of roller engagement; and I further provide the mechanism with control means serving to set the roller axis in or out of parallelism with the generatrix.

When the axis of revolution of the friction roller is in parallel to the generatrix of the revolving drive member, the roller runs idle and imparts no driving force to the structure carrying the roller. When the roller axis is placed at an angle to the generatrix, a force in the translational direction is imparted to the structure so that the latter is driven along the drive member. Returning the roller axis to parallelism will again stop the structure.

The generatrix of the rotor should have a continuous and substantially regular shape and is preferably a straight line, as in the case of a cylinder or cone. With a rotor of cylindrical shape, the velocity of the driven structure is directly proportional to the angle of deflection from parallelism of the roller axis so that the mechanism functions like a screw and nut of continuously variable helix angle.

The foregoing and other objects and features of my invention will be more fully understood from the following description of the embodiments illustrated in the drawings and representing the invention by the example of a fly shuttle drive for weaving looms.

Figs. 1, 2 and 3 show three different views, at right angles to one another, of the shuttle drive. Fig. 4 is a sectional view, the section being taken along the plane denoted in Fig. 3 by IV—IV. Fig. 5 is a cross section along the plane marked V—V in Fig. 4. Fig. 6 is a schematic representation of a second embodiment having a frusto-conical drive member instead of the cylindrical member of the first embodiment.

Referring to Figs. 1 through 5, numeral 1 denotes a composite stationary frame or supporting structure to be mounted on the frame structure of a loom. A rotor 2 of elongated cylindrical shape is revolvably mounted on the frame structure and is connected by a coupling 3 with an electric drive motor 4 operating substantially at constant speed. The rotor 2 is maintained in continuous revolution during the operating period of the weaving loom. Pressed against the cylindrical surface of the rotor is a friction roller 5 which is mounted on a ball bearing 6 whose hub portion is seated on a shaft 7. The shaft is attached to a fork-shaped supporting member 8. Integral with this member is a pinion shaft 9. The axis of this pinion shaft extends at a right angle to the generatrix and to the geometrical axis of the cylindrical drive member 2, and the axis of revolution of the roller 5 is at a right angle to the axis of pinion shaft 9.

Shaft 9 is journalled in two ball bearings 10 and 11. Bearing 11 rests against an abutment 12 which forms part of a carriage structure and is rigidly connected to the other parts of this structure denoted by 13, 14 and 15. Shaft 9 and ball bearing 10 are axially displaceable within the part 13 and a helical compression spring 16 disposed within part 13 and between the bearings 10 and 11 forces supporting structure 8 and friction roller 5 toward the surface of the drive member 2. Roller support 8 and pinion shaft 9 are freely revolvable relative to the carriage structure.

The reaction of spring 16 presses the carriage structure against a pair of rails 17 and 18 running alongside the drive rotor 2 and in parallel to the rotor axis. The carriage structure rides on these rails with two pairs of wheels 19, 20, and 21, 22 respectively. The wheels consist of roller bearings and are mounted on two shafts 23 and 24. Shaft 24 is journalled in the rigid carriage structure, i. e. its bearings are secured to or integral with part 14 of the structure while the bearings (not illustrated) of shaft 23 are elastically suspended from the carriage structure in order to obtain a substantially uniform distribution of the spring load on all four carriage wheels.

Attached to part 14 of the carriage structure is a member 25 that carries a tubular drive rod 26. A cup-shaped abutment 27 is attached to the end of rod 26 for engaging a fly shuttle 28 to be propelled by the drive mechanism.

When the axis of revolution of the friction roller 5, this axis being denoted in Fig. 4 by a dot and dash line marked A, is in the illustrated position of parallelism with the direction of the generatrix of rotor 2 at the point of engagement with roller 5, the revolution of the drive member has merely the effect of revolving the roller 5 about its axis but imparts no force to the carriage structure in the direction of the rails 17 and 18. However, when shaft 9 is turned, thereby twisting the roller axis A relative to the axis or generatrix of the rotor 2, the entire carriage assembly is propelled along the rails.

In a drive mechanism of this nature, there is little or no slippage at the point of contact between the friction roller 5 and the drive member 2. Hence the angular displacement of the roller shaft A by means of the shaft 9 causes the point of contact between roller 5 and rotor 2 to be displaced axially along the rotor with a velocity substantially equal to the peripheral velocity of the rotor times the tangent of the angle through which shaft 9 has been turned. An extremely rapid response of the drive mechanism is obtained by selecting a peripheral rotor speed of sufficiently high magnitude. For example, with 3½ inches diameter and 3500 R. P. M. speed of the rotor, an angular displacement of 39.2° of the friction roller 5 will cause it to run along the rotor at an axial velocity of 45 ft./sec. It is of course necessary to provide suitable means for controlling the angular position of the friction roller and it is especially advantageous, in accordance with my invention, to devise these control means in such a manner that the speed, movement or position of friction roller and carriage structure is at all times definitely prescribed by the chosen adjustment of the control devices. In accordance therewith, the control devices embodied in the illustrated shuttle drive are designed so that the carriage assumes always a position which is proportional to the displacement of a control lever. Details of these control means will be described presently.

A control shaft 31 extending in parallel to the cylindrical axis of rotor 2 is revolvably mounted on the supporting frame 1 of the drive mechanism and carries at one end a control lever 32 which can be be displaced angularly by means of a connecting rod 33 actuated by a suitable cam shaft or crankshaft (not shown) of the loom driving system. As is best apparent from Fig. 4, a sleeve member 34 is slidably seated on the control shaft 31. A key engagement between parts 34 and 31 permits the sleeve 34 a free displacement axially along the shaft 31 but prevents it from revolving relative thereto. A shaft 35 rigidly secured to sleeve 34 carries a bevel gear 36 which meshes with an idler gear 37 that is revolvably seated in part 12 of the carriage structure. Gear 37 meshes with a bevel gear 38 mounted on a shaft 39 which extends coaxially with the pivot shaft 9 of the roller support 8 and is so keyed to the pivot shaft 9 as to impart an angular displacement to it. Gear 36 meshes also with a gear 40 freely revolvable about control shaft 31 and revolvably seated in part 12 of the carriage structure. Gear 40 is firmly connected with a worm gear 41. A worm 42 meshing with gear 41 is rigidly connected with a spur gear 43 which, in turn, meshes with a rack 44 that is integral with the rail 18 and extends parallel to, and along the entire length of, the path of motion of the carriage structure.

When the carriage structure and friction roller are in the illustrated position of rest (Fig. 4), the angular displacement of shaft 31 has the effect of displacing the shaft 35 angularly toward or away from the observer. Since, initially, the gear 40 does not revolve, such displacement has the effect of turning the gear 37, thereby imparting a corresponding angular displacement to the gear 38. Consequently, the pivot shaft 9 is turned through an angle which corresponds to the degree of angular displacement of the control lever 32. As explained previously, this pivotal adjustment causes the roller 5 to drive the carriage structure along the drive rotor thereby propelling the fly shuttle 28 at high speed. As the carriage structure moves along the rails 17 and 18, the spur gear 43 meshing with rack 44 is turned so as to impart through gears 41, 40, 36, 37 and 38, a return motion to the pivot shaft 9. Hence this shaft is gradually moved back into the zero position in which the roller axis A is again in parallel with the generatrix or axis of the drive member 2. When this position is reached, no further propelling force is imposed on the carriage structure so that the structure stops. For example, with a rotor diameter of 3½ inches, all other dimensions being proportional in accordance with the drawing, and the gear ratios being as illustrated, a displacement of control lever 32 by an angle of about 23 degrees will cause a translational displacement of the carriage structure of about 12 inches. The available propulsion force is equal to the force of spring 16 times the coefficient of friction between the rotor 2 and roller 5. For dry, unlubricated surfaces, this coefficient may become as high as 0.4. The embodiment exemplified by the drawing, for instance, was designed for a driving force of 250 lbs. by providing a compression spring force of 900 lbs.

In order to illustrate a performance obtainable with a drive mechanism of the illustrated type, the following numerical values may be mentioned by way of example. With a total weight of the complete carriage structure of 3 lbs. and a shuttle weight of 1 lb., the output force of 250 lbs. mentioned in the foregoing will impart to the combined weight an acceleration of $250/4 = 62\frac{1}{2}$ g. This acceleration ($a$) is sufficient to produce a velocity ($V$) in a distance ($d$) as determined by the equation $$d = \frac{V^2}{2a}$$

if the maximum velocity is 45 ft./sec., the distance ($d$) amounts to:

$$d = \frac{45^2}{2 \times 62.5 \times 32.2} = \frac{1}{2} \text{ ft.}$$

In other words, the maximum velocity in the example here referred to, is reached at the end of 6 inches of travel so that from then on the shuttle flies away from the carriage structure toward the opposite side of the loom where a similar driving device is located. The carriage structure continues to move a further distance of 6 inches at a gradually reducing speed. As the carriage velocity declines, the kinetic energy of the structure is fed back to the drive rotor causing it to speed up. In this manner, the carriage structure is stopped gradually so that a high velocity impact as occurring in known shuttle drives is prevented. In other words, the driven structure approaches each new position in a substantially exponential way due to the fact that when the actuating roller reaches its new position, its axis is parallel to the generatrix of the drive member and its actual velocity is zero. Incidentally, this characteristic is also effective to prevent an over-shooting or hunting tendency of the driven structure, a feature which is desirable not only for shuttle drives but also for applications in which a mechanism according to my invention is used for positioning purposes.

Referring to the illustrated sample of a shuttle drive, it will be understood that in a loom two such drives are arranged on opposite sides to drive the shuttle back and forth. After the shuttle has been ejected from one drive, as is described in the foregoing, the control lever 32 of that drive is angularly displaced by the connecting rod 33 under control by the above-mentioned cam shaft or crank shaft of the loom driving system (not shown) in the direction required to return the carriage structure into the illustrated initial position before the returning shuttle reaches the abutment 21 (Figs. 1, 2). Braking devices and other auxiliary equipment may be provided as customary in looms, but such equipment does not form part of the invention proper and need not be different from what is known in this art and, hence, is not illustrated in the drawing.

It will be obvious from the foregoing description that the mechanism according to the invention is applicable as a drive for missile type bodies or structures in general. However, it will also be understood that the mechanism is likewise applicable as a servomotor due to the fact that the translationally driven structure changes its position in accordance with the selected adjustment of the control device and under a force many times greater than that effective at the control device. For instance, if the carriage structure in the illustrated example is connected with some machine or valve member to be adjusted, the adjustment is at all times controlled by the chosen angular deflection of the control lever 32. The fact that any change in the position of lever 32 causes a corresponding displacement of the carriage structure at an extremely high speed without appreciable tendency to overshoot, renders this type of positioning device especially advantageous for use in control and regulating systems where a high speed of response is required.

While the above described embodiment of my invention is provided with a drive rotor of cylindrical shape, the embodiment shown in Fig. 6 will exemplify the possibility of using drive rotors of different configuration. According to Fig. 6, a drive rotor 50 of frusto-conical shape is employed. The rotor revolves about its geometrical axis 51 and is engaged by a friction roller 52 whose supporting fork 53 is attached to a pivot shaft 54 mounted on a carriage structure 55 which is movable along rail or guide means 55. The rail means 55 extend in parallel to the direction of the generatrix of rotor 50 at the point of engagement between rotor and roller. When the axis of revolution of roller 52 is in parallel to the direction of the generatrix, the carriage 55 remains at rest. When the shaft 54 is turned so that the roller axis is placed at an angle to the generatrix the carriage structure 55 is propelled along the rail means 56 until the pivot shaft 54 is turned back into the original position. In a mechanism of this type, the speed of the carriage when travelling along its rails increases at a higher rate than in the preceding embodiment.

It will be understood by those skilled in the art that my invention permits of various modifications and changes without departure from its gist and principle and within the scope of its essential features set forth in the claims annexed hereto.

I claim as my invention:

1. A device for imparting controlled translational motion from a source of rotary power, comprising a stationary supporting frame, a drive member shaped as a body of revolution and being revolvable about its geometrical axis relative to said frame, a structure guided on said frame for motion along said drive member, a support mounted on said support and being angularly adjustable relative thereto, a friction roller revolvably mounted on said support and in frictional engagement with said drive member, control means connected with said support for adjusting it relative to said structure in order to control the angular position of the axis of revolution of said roller relative to the direction of the generatrix of said drive member at the point of engagement with said roller so that, during revolution of said drive member, said structure is caused by said roller to travel along said drive member when said roller axis is placed at an angle to said generatrix by said control means, and return means for readjusting said support to a position wherein said roller axis is in parallel to said generatrix, said return means being disposed on said frame and engaging said support along the path of travel of said structure so as to progressively turn said support during the travel of said structure into said position whereby said structure is stopped at a point of travel dependent upon the degree of adjustment effected by said control means.

2. A device for imparting controlled translational motion from a source of rotary power, comprising a stationary supporting frame, a drive member shaped as a body of revolution and being revolvable about its geometrical axis relative to said frame, a structure guided on said frame for motion along said drive member, a support mounted on said support and being angularly adjustable relative thereto, a friction roller revolvably mounted on said support and in frictional engagement with said drive member, differential adjusting means associated with said support for controlling its angular position relative to said structure, control means for imparting a component control effect to said adjusting means tending to place the axis of revolution of said roller at an angle to the direction of the generatrix of said drive member at the point of engagement with said roller in order to cause said structure to move along said drive member, and return means for imparting another control effect to said adjusting means in dependence upon the position of said structure along said drive member and tending to place said axis of roller revolution in parallel to said generatrix in order to limit the motion of said structure.

3. A device for imparting controlled translational motion from a source of rotary power, comprising a drive member shaped as a body of revolution with a substantially straight generatrix and being revolvable about its geometric axis, guide means extending alongside said drive member, a movable structure guided by said guide means, a support mounted on said support and being angularly adjustable relative thereto, a friction roller revolvably mounted on said support and in frictional engagement with said drive member, a differential gear mounted on said structure and having an output gear wheel connected with said support and two input gear wheels for causing said output gear wheel to angularly adjust said support in accordance with the differential motion of said input wheels, control means for adjusting one of said input wheels in the direction required for adjusting said support for a deflection of the axis of revolution of said roller from parallelism with said generatrix, and gear means comprising a rack extending along said guide means and engaging said other input wheel for adjusting it in dependence upon the position of said structure and in the direction required for returning said roller axis of revolution to parallelism.

4. A device for imparting controllable translational velocity to a mass from a substantially constant speed source of rotary power, comprising an elongated cylindric drive member revolvable about its cylinder axis, said means and a rack extending alongside said drive member in parallel to the cylinder axis of said member, a carriage structure guided on said rail means, a support pivoted on said carriage structure for revolution about a pivot axis extending at a right angle to said cylinder axis, a friction roller journalled on said support for revolution about a roller axis extending at a right angle to said pivot axis, a differential gear mounted on said structure and having an output gear wheel connected with said support and two input gear wheels for causing said output gear wheel to angularly adjust said support in accordance with the differential motion of said input wheels, control means having a revolvable shaft extending alongside said drive member and engaging one of said input wheels for turning it in the direction required for deflecting said roller axis from parallelism with said cylinder axis, and gear means disposed on said carriage structure between said other input gear wheel and said rack for turning said other wheel in dependence upon the position of said structure and in the direction required for returning said roller axis to parallelism with said cylinder axis.

5. A shuttle drive, comprising an elongated cylindric drive member revolvable about its cylinder axis, rail means extending alongside said drive member in parallel to said cylinder axis, a carriage having wheels in engagement with said rail means to be displaceable relative thereto and having shuttle engaging means for imparting motion to the shuttle when moving along said rail means, a support mounted on said carriage and being angularly adjustable relative thereto, a friction roller revolvably mounted on said support and in frictional engagement with the cylindric surface of said drive member, control means connected with said support for adjusting it relative to said carriage in order to control the angular position of the roller axis relative to said cylinder axis so that, during revolution of said drive member, said carriage remains at rest when said roller axis is in parallel to said cylinder axis and is driven along said rail means when said roller axis is placed at an angle to said cylinder axis, and return means disposed along said rail means for engaging said support in order to turn it into a position wherein said roller axis is again in parallel to said cylinder axis whereby said carriage is automatically stopped after completion of a predetermined length of travel.

6. A shuttle drive, comprising a drive member shaped as a body of revolution with a generatrix of continuous and substantially regular shape and being revolvable about its geometric axis, rail means extending alongside said drive member substantially in parallel to said generatrix, a carriage having wheels in engagement with said rail means to be displaceable relative thereto and having shuttle engaging means for imparting motion to the shuttle when moving along said rail means, a support mounted on said carriage and being angularly adjustable relative thereto, a friction roller revolvably mounted on said support and in frictional engagement with the surface of said drive member, control means connected with said support for adjusting it relative to said carriage in order to control the angular position of the roller axis relative to said generatrix so that, during revolution of said drive member, said carriage remains at rest when said roller axis is in parallel to said generatrix and is driven along said rail means when said roller axis is placed at an angle to said generatrix, and return means disposed along said rail means and engaging said support so as to progressively turn said support, during the travel of said carriage, into a position wherein said roller axis is in parallel to said generatrix, whereby said carriage is stopped at a point of travel determined by the degree of adjustment effected by said control means.

7. A shuttle drive, comprising a drive member shaped as a body of revolution with a straight generatrix and being revolvable about its geometric axis, rail means extending alongside said drive member in parallel to said generatrix, a carriage having wheels in engagement with said rail means to be displaceable relative thereto and having shuttle engaging means for imparting motion to the shuttle when moving along said rail means, a support mounted on said carriage and being angularly adjustable relative thereto, a friction roller revolvably mounted on said support and in frictional engagement with said drive member, differential adjusting means associated with said support for controlling its angular position relative to said carriage, control means for imparting a component control effect to said adjusting means tending to place the axis of revolution of said roller at an angle to the direction of the generatrix of said drive member at the point of engagement with said roller in order to cause said carriage to move along said drive member, and return means for imparting another control effect to said adjusting means in dependence upon the position of said structure along said drive member and tending to place said axis of roller revolution in parallel to said generatrix in order to limit the motion of said carriage.

8. A shuttle drive, comprising an elongated cylindric drive member revolvable about its cylinder axis, means for revolving said member at substantially constant speed, rail means and a rack extending alongside said member in parallel to said axis, a carriage structure having rollers in engagement with said rail means so as to be movable along said drive member and having shuttle engaging means for imparting motion to the shuttle to be driven, a support pivoted on said carriage structure for revolution about a pivot axis extending at a right angle to said cylinder axis, a friction roller journalled on said support for revolution about a roller axis extending at a right angle to said pivot axis, differential gear mounted in said structure and having an output gear wheel connected with said support and two input gear wheels for causing said output gear wheel to angularly adjust said support in accordance with the differential motion of said input wheels, control means having a revolvable shaft extending alongside said drive member and engaging one of said input wheels for turning it in the direction required for deflecting said roller axis from parallelism with said cylinder axis, and gear means disposed on said carriage structure between said other output gear wheel in dependence upon the position of said structure and in the direction required for returning said roller axis to parallelism with said cylinder axis.

STANLEY J. MIKINA.

REFERENCES CITED

The following references are of record in the file of this patent:

UNITED STATES PATENTS

| Number | Name | Date |
|---|---|---|
| 2,215,678 | Weathers | Sept. 24, 1940 |
| 2,382,105 | Sarver | Aug. 14, 1945 |
| 1,358,474 | Souczek | Nov. 9, 1920 |
| 2,082,896 | Lindegren | June 8, 1937 |

FOREIGN PATENTS

| Number | Country | Date |
|---|---|---|
| 288,639 | Great Britain | Dec. 6, 1928 |
| 350,417 | Germany | Mar. 18, 1922 |